United States Patent [19]
Paterson

[11] Patent Number: 5,255,629
[45] Date of Patent: Oct. 26, 1993

[54] RIDER REMOTE-CONTROLLED CUTTING HORSE TRAINER

[76] Inventor: Jerry Paterson, 2160 Lois Rd. E., Sanger, Tex. 76266

[21] Appl. No.: 848,013

[22] Filed: Mar. 9, 1992

[51] Int. Cl.5 .............................................. A01K 15/02
[52] U.S. Cl. .................................... 119/839; 273/366
[58] Field of Search ................... 119/29, 174; 273/366

[56] References Cited

U.S. PATENT DOCUMENTS

| | | | |
|---|---|---|---|
| 3,303,821 | 2/1967 | Harris | 119/29 |
| 3,962,995 | 6/1976 | Brinson | 119/29 |
| 4,738,223 | 4/1988 | Andreasen | 273/366 |

Primary Examiner—John G. Weiss
Attorney, Agent, or Firm—Daniel V. Thompson

[57] ABSTRACT

Apparatus for the training of cutting horses includes a calf replica mounted to a track for traversing movements along the track. Motive apparatus for causing the calf replica to traverse along the track is reversible in two opposite directions. Program apparatus causes the motive apparatus to execute a programmed series of movements of the calf replica.

6 Claims, 6 Drawing Sheets

RIDER REMOTE-CONTROLLED CUTTING HORSE TRAINER

FIELD OF INVENTION

This invention relates to animal training devices, and more particularly to a mechanical simulated calf for use in training horses which will ultimately be employed in cattle herding operations or cutting horse competitions.

BACKGROUND OF THE INVENTION

Cutting horses are used in cattle herding operations to separate calves from a herd. The cutting horse rider maneuvers the calf away from the herd by approaching the calf head-on with the cutting horse, thereby forcing the calf to be removed or "cut" from the herd.

Cutting horses require special training to be able to perform the cutting function. In addition, the training must be often repeated to keep a good cutting horse at the top of its form.

Cutting horse training is not only a time-consuming process but also an expensive one. This is because live calves can only be used in a cutting situation three or four times before they lose their fear of the cutting horse and learn to act inappropriately. Thus, a cutting horse trainer requires an endless of supply of calves that have not previously faced cutting situations. The logistics and expense of such an operation are out of the reach of all but the most serious users of cutting horses or cutting horse enthusiasts.

Another factor at work in the modern day cutting horse field is the fact that cattle ranches by and large no longer use cutting horses in their every day cattle operations. Now cutting operations are performed by cowboys on motor bikes or four-wheeled all terrain vehicles. There is, however, an ever-growing hobby and sport use of cutting horses, with competitions being regularly held at rodeos, state fairs and the like across western part of the United States. It is obvious that the occasional hobbyist cannot work his horse often enough using live calves to keep his horse in top condition for shows and competitions.

Numerous attempts have been made to solve the problem of economically training cutting horses. U.S. Pat. No. 3,962,995 to Brinson discloses an artificial calf mounted to swivel, advance and retreat, and sweep back and forth in a horizontal plane. An operator separate from the horse rider is required to operate the Brinson apparatus. U.S. Pat. No. 3,303,821 to Harris discloses a mechanical cutting calf that is radio remote controlled, again, by an operator separate from the rider. The calf replica is on a wheeled frame. The propulsion and control is entirely self-contained, as the Harris calf does not run on any track with external propulsion provided.

U.S. Pat. No. 4,738,223 to Andreasen discloses a horse training apparatus where a calf replica is carried on an endless carrier with a reversible, variable speed drive externally provided. The Andreasen device also requires a second person to operate the device.

A remotely analogous area of the art involves apparatus for training roping horses and riders, as opposed to cutting horses These patents include U.S. Pat. No. 4,960,076 (Snorgrass, et al), U.S. Pat. No. 2,819,900 (Brackett), U.S. Pat. No. 4,286,788 (Simington, et al), U.S. Pat. No. 4,266,779 (English), and U.S. Pat. No. 3,324,832 (McCain). The roping horse trainers are relatively simple, as the required movements of the calf replica are less complicated in a roping situation, where a calf typically runs in a straight line. Thus, simulating calf roping is a much simpler problem than simulating a calf for a cutting horse.

Finally, remote radio control is disclosed in U.S. Pat. No. 3,733,530 to Labart, et al for a bucking strap. After a rodeo contestant has ridden a bucking horse or bull for a specified interval of time, the remote controlled receiver releases the bucking strap. In U.S. Pat. No. 4,765,276 to Kime, a multi-channel radio-controlled robotic jockey/monitor is provided to simulate a jockey on a race horse.

Yet another prior art system was known as the "Warvell Cutter". The Warvell Cutter had a mechanical calf which moved on tracks, controlled by hydraulics. A second person was required to operate the system.

Thus, there presently exists a need for a cutting horse trainer that can be economically manufactured and operated. Preferably, the trainer is configured so that the operations of the calf replica may be controlled by the rider. To provide rider remote control, the controls must be simplified so that they may be manipulated while riding, with the movements of the calf being provided by relatively sophisticated program and control intelligence.

SUMMARY OF THE INVENTION

The present invention provides a rider remote-controlled cutting horse trainer that provides simple control functions by incorporating a powerful programming feature into the motive means for the calf replica. The calf replica is programmed to execute a programmed series of movements, and the rider merely stops and starts the program by remote control. This is in contrast to the prior art systems where either (1) a second human controlled the movements of the calf replica at will, and no programming was utilized, as in the Brinson device (U.S. Pat. No. 3,962,995) or (2) a second operator controlled the calf replica by remote control, causing movements at will without programming, as in the Harris system (3,303,821). In the Brinson device, the calf replica is fixed to the apparatus and the operator manipulates the replica through a limited number of movements at will. In the Harris device, remote control is used because the calf is not fixed to any apparatus, but the control functions are numerous including speeds, direction and turns. The number of functions required for remote calf control in the Harris device dictates that a second operator be used. A rider could not control the Harris calf and still be able to concentrate on training the horse.

BRIEF DESCRIPTION OF THE DRAWINGS

A more complete understanding of the invention and its advantages will be apparent from the Detailed Description taken in conjunction with the accompanying Drawings in which:

FIG. 8 is a schematic of the program means for the invention;

FIG. 9 illustrates the remote control means for the apparatus;

FIG. 10 illustrates a rider with the remote control means, in use;

DETAILED DESCRIPTION OF THE PREFERRED EMBODIMENT

Figure 1:
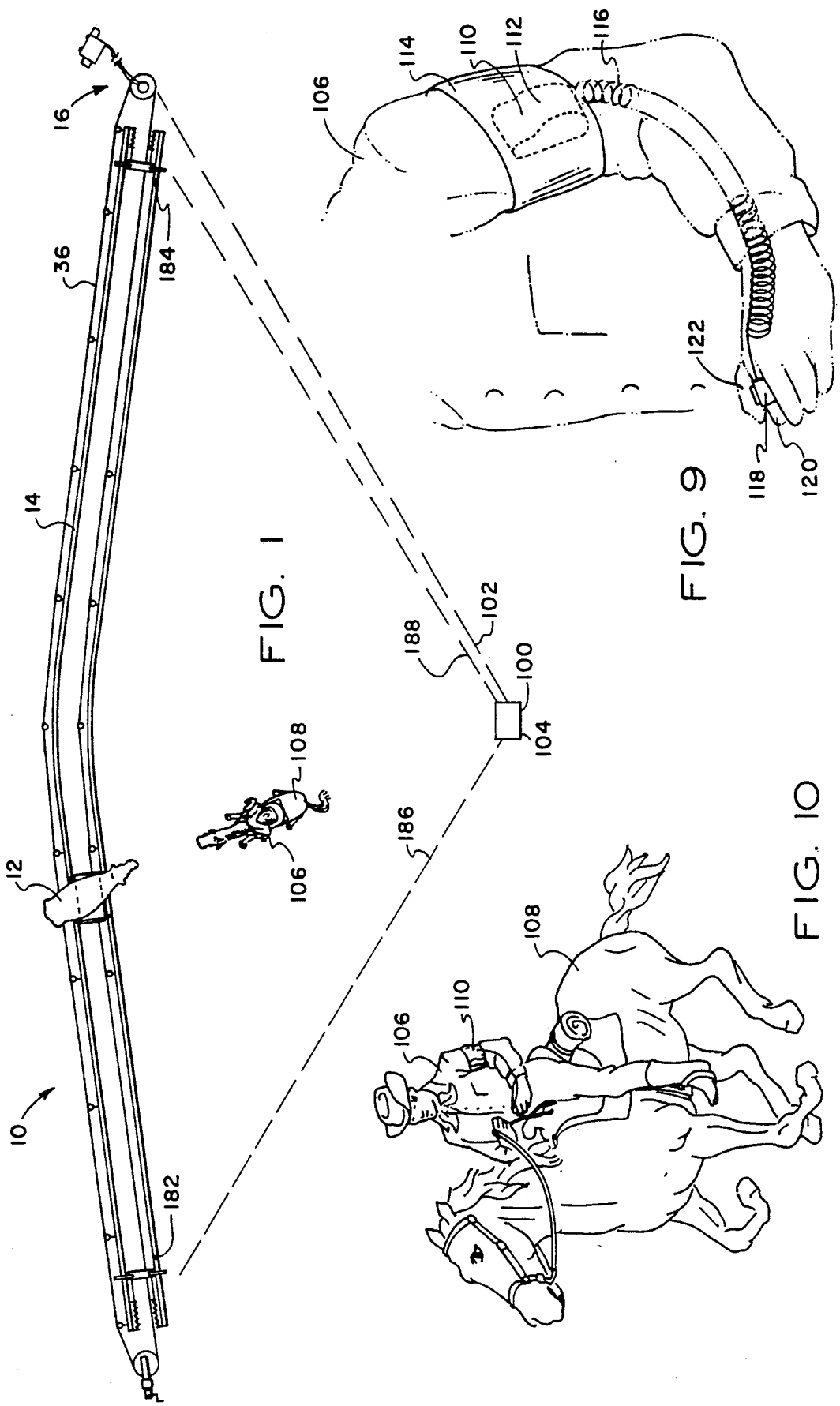
FIG. 1 is a plan view of a horse and rider using the invention.
Figure 2:
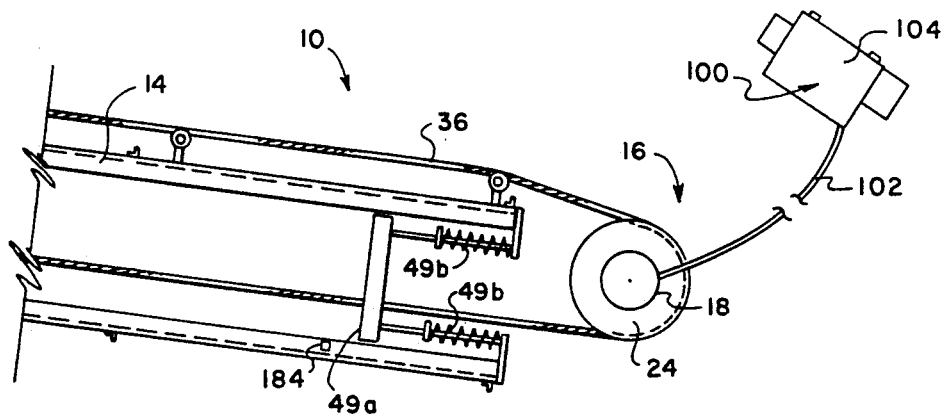
FIG. 2 is a partial plan view of the drive end of the invention.
Figure 3:
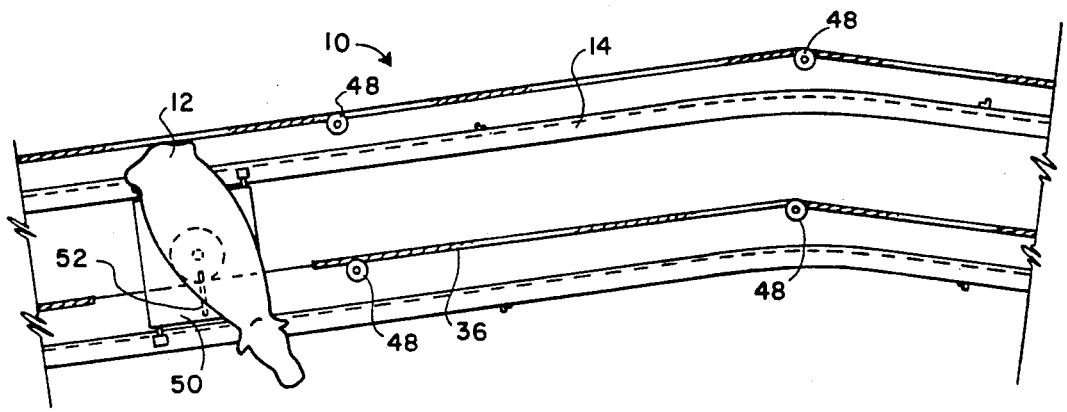
FIG. 3 is a partial plan view of a calf replica used in the invention.
Figure 4:
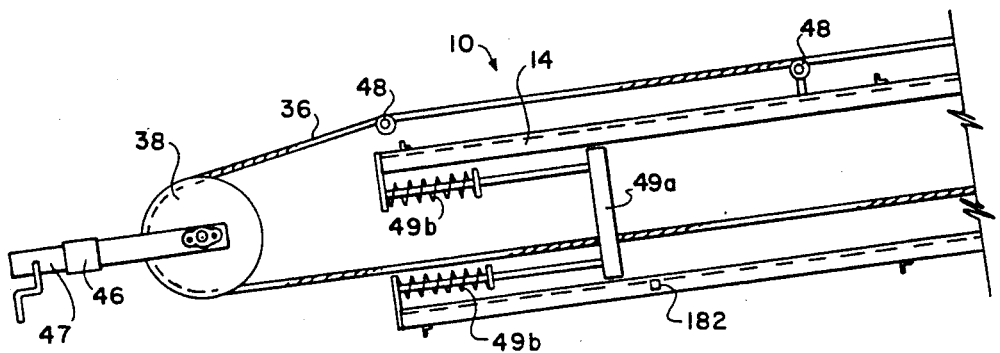
FIG. 4 is a partial plan view of the idler end of the invention.
Figure 5:
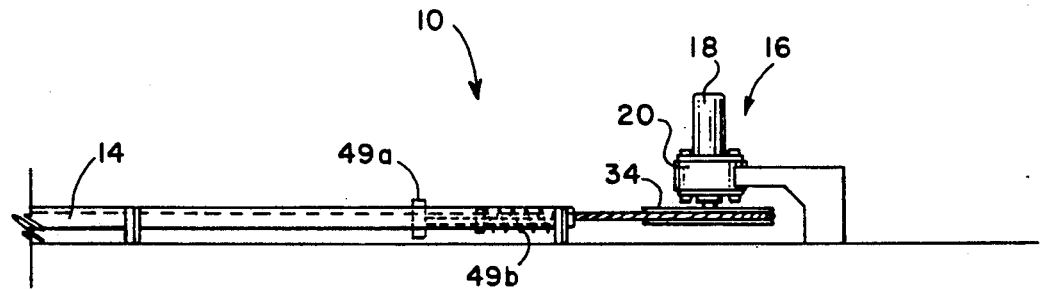
FIGS. 5, 6 and 7 are partial elevation views corresponding to FIGS. 2, 3 and 4, respectively.
Figure 6:
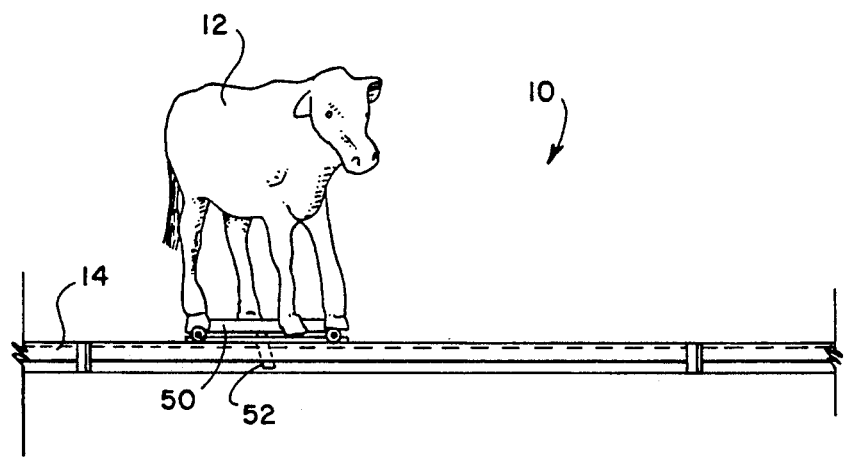
Figure 7:
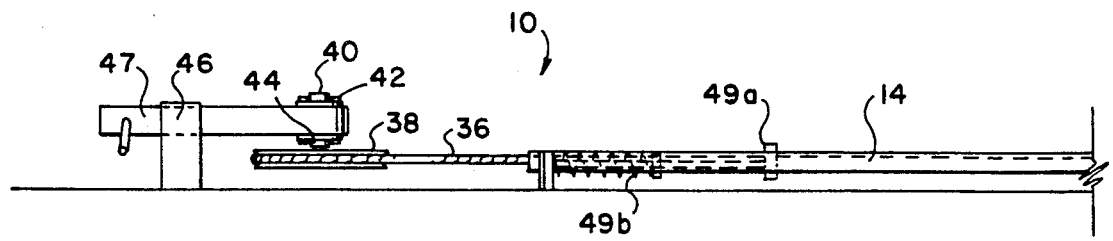

Referring initially to FIGS. 1-7, apparatus 10 for the training of cutting horses includes a calf replica 12 mounted to a track 14 for traversing movements along the track. Motive means 16 for causing calf replica 12 to traverse along track 14 includes an electric motor 18, a gear reducer 20 (FIG. 5), a drive pulley 24, and a drive rope 36.

At the opposite end of track 14, rope idler pulley 38 (FIGS. 4, 7) is operatively engaged with drive rope 36. Rope idler pulley 38 is mounted to a shaft 40, bearings 42, 44, and frame 46 which is fixed in the ground by way of an adjustable screw jack 47. Jack 47 allows rope 36 to be tensioned. Motor 18 is reversible and variable in speed, and rotations of motor 18 cause drive rope 36 to circulate back and forth along track 14. A number of guide pulleys 48 are provided to maintain alignment of drive rope 36. End stops 49a are mounted to track 14 by way of shock absorber springs 49b.

Calf replica 12 is mounted to a carriage 50 connected to one side of drive rope 36. Thus it can be seen that motive means 16 is reversible in two opposite directions, and the motive means 16 is capable traversing the calf replica at a plurality of velocities depending on the rotation speed of motor 18. A double-acting, adjustable shock absorber 52 mounts the calf replica to the carriage.

The track and calf replica just described preferably ar those previously made available under the name The Warvell Cutter. As described above, the prior art Warvell Cutter originally was powered by a hydraulic motor controlled by a second person necessary to move the calf replica at will.

Control means 100 is operatively connected to motor 18 by way of a cable 102. Control means 100 is enclosed in an enclosure 104 mounted to the ground.

Figure 11:
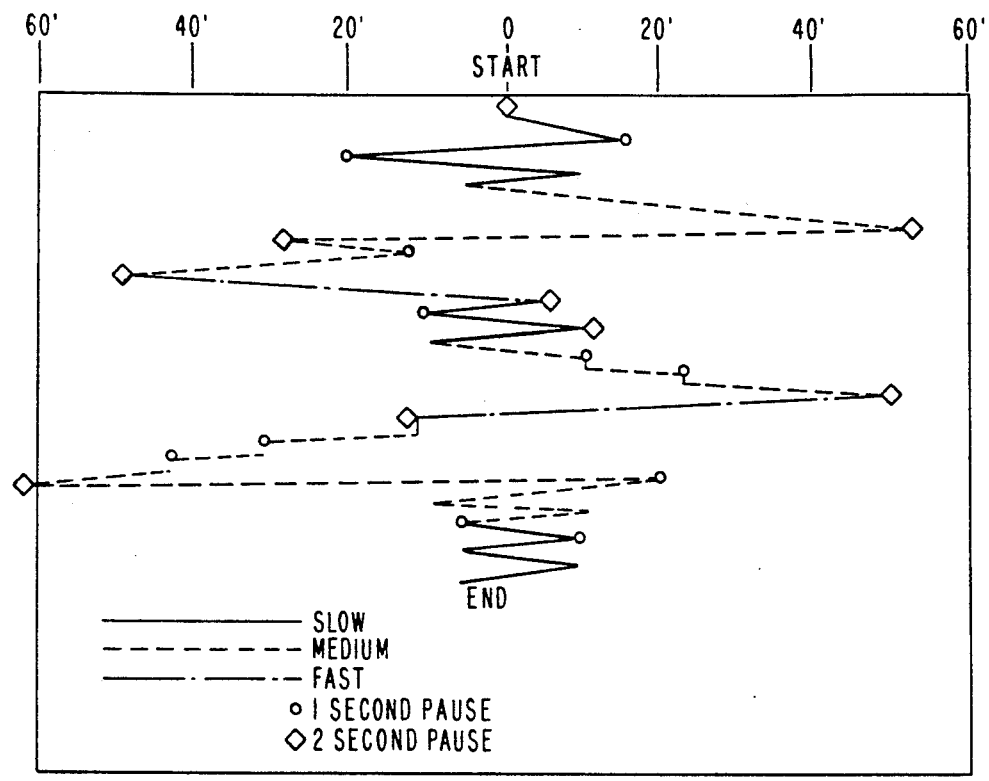
FIG. 11 illustrates a programmed series of movements for a calf replica.

Control means 100 includes program means for causing the motive means to execute a programmed series of movements of the calf replica. The programmed series of movements has predetermined directions, velocities, durations, and pauses of the calf replica movements. An example program is illustrated in FIG. 11 and Table 1. A key advantage of this invention is that an infinite number of programs can be devised for the system. As will be described below, one embodiment of the apparatus has four separate programs selectable by a switch, with each of the programs being reversible, for a total of eight programs available. This is a sufficient number of different programs that the cutting horse being trained will not learn any particular series of movements, thereby defeating the purpose of the training procedure. Alternatively, more powerful controllers can be utilized which enable internal storage of multiple programs.

As can be seen in FIG. 11 taken in conjunction with Table 1, the program starts with a two second pause at step 0. Next, the calf replica moves 15 feet to the right in one second, at a slow speed, there being slow, medium and fast speeds selectable. After a one second pause, the calf replica moves to the left 35 feet in approximately 3 seconds. After a one second pause, the calf replica moves right again a distance of 30 feet in 2 ½ seconds. With no pause, the direction change being instant, the calf replica then moves 15 feet to the left in 1 second as indicated by step 4 on Table 1. Then, the speed of the calf replica is changed to the medium speed, and after an instant direction change the calf replica moves 57 feet in 3.7 seconds. After a 2 second stop, the calf replica moves to the left 78.5 feet in 5.3 seconds. After another 2 second stop, the calf replica moves to the right 17 feet in 0.8 seconds. After a one second stop, the calf replica moves to the left again 35 feet in 2.0 seconds. After a 2 second stop, the calf replica changes speeds again to the fast speed and moves 52 feet in 2.5 seconds Table 1, and include a variety of speeds, distances, durations and pauses of the calf replica.

Referring now to FIGS. 9 and 10, rider 106 is mounted on cutting horse 108. Rider 106 is fitted with first and second remote control means 110, which includes a three channel radio transmitter 112 held by an arm band 114 to rider 106. A coiled cable 116 extends to switches 118 mounted to the index finger 120 of rider 106. Switches 118 preferably are operable by the thumb 122 of rider 106, and are arranged so that signals on any of the three channels may be transmitted by transmitter 112 upon suitable manipulation of the switches.

Figure 12:
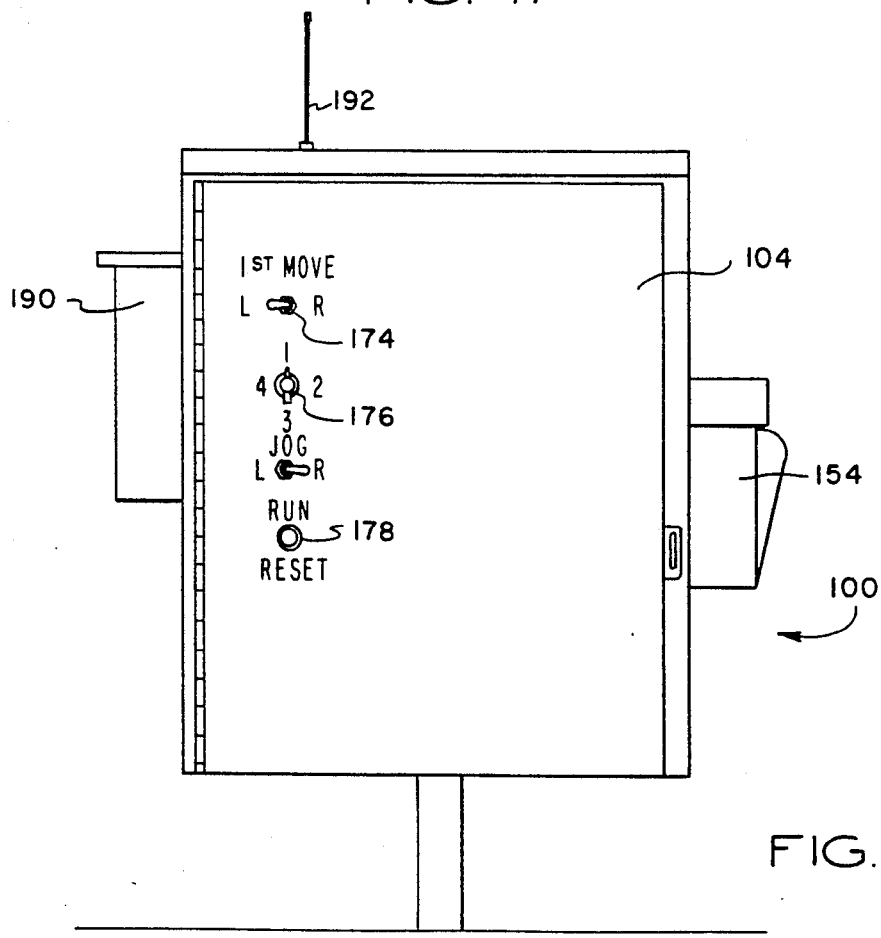
FIG. 12 is a front view of control means for the invention.
Figure 13:
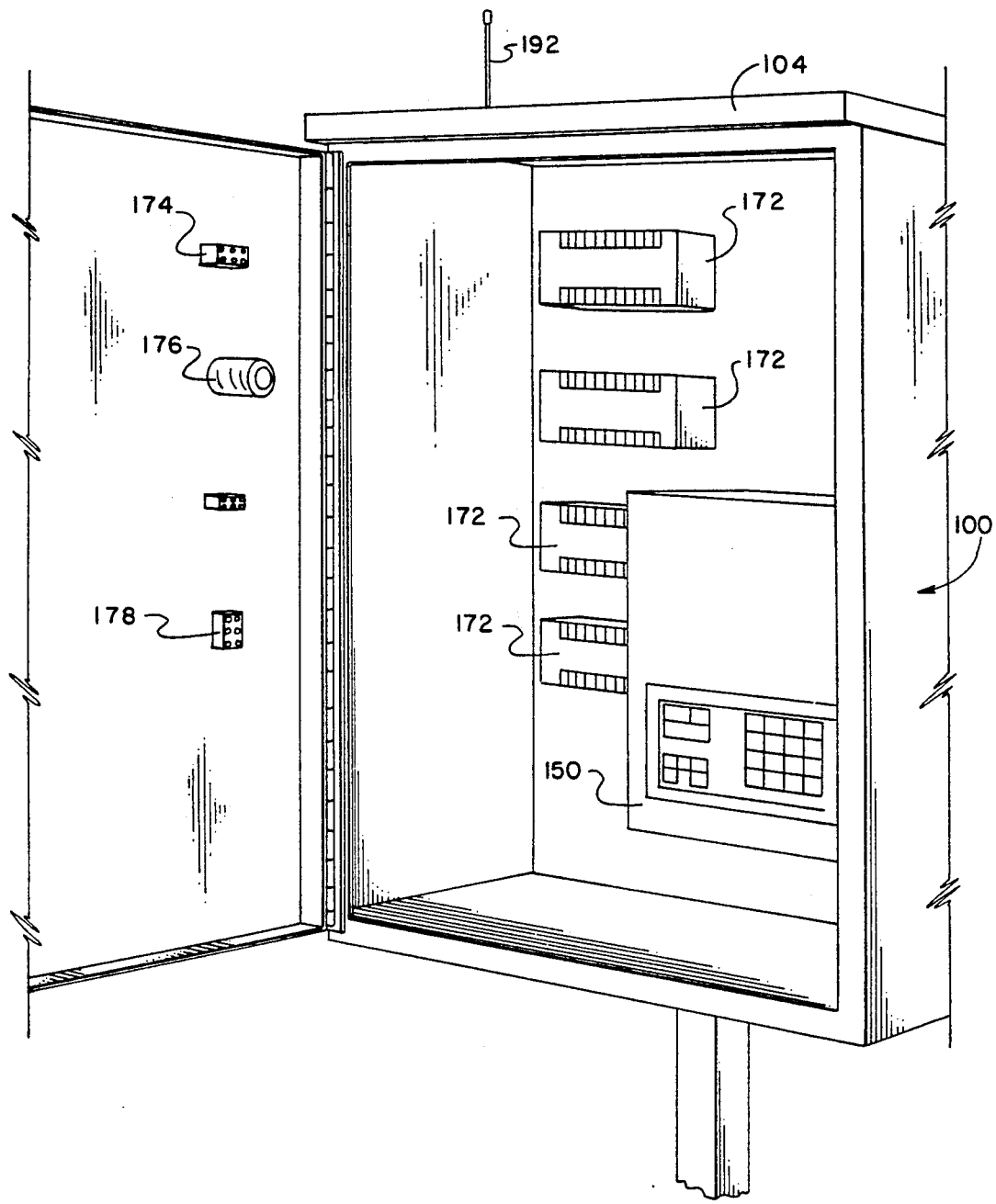
FIG. 13 is a view similar to FIG. 12 with the enclosure door open.
Figure 14:
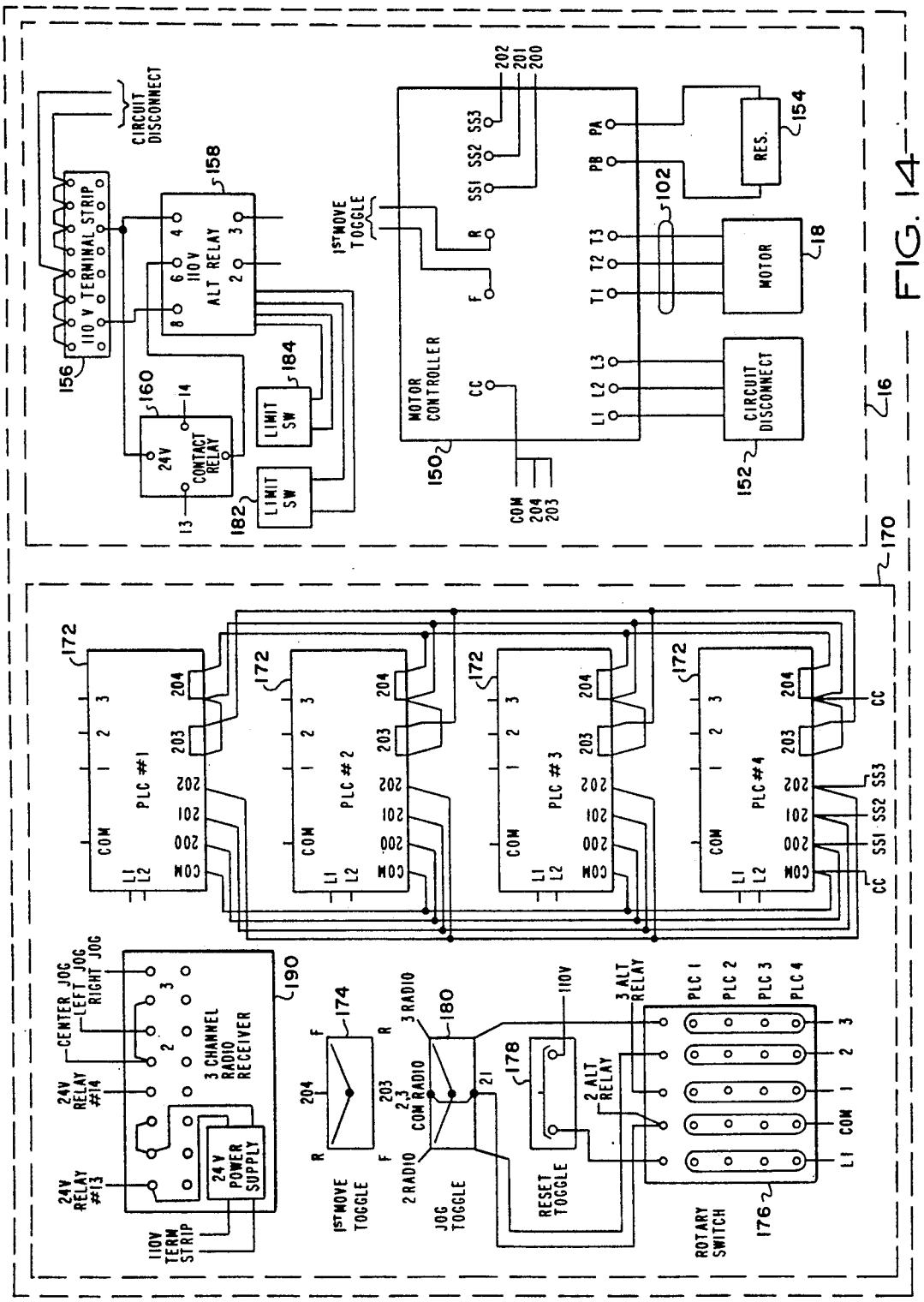
FIG. 14 is a schematic of the control means.

Referring now to FIGS. 12-14, control means 100 includes a motor controller 150 connected by way of cable 102 to motor 18. A main circuit disconnect 152 is enclosed in enclosure 154 (FIG. 12). In the described embodiment, motor controller 150 is a TOSVERT-130G2 transistorized invertor manufactured by Toshiba International Corporation of Houston, Tex. When utilized in conjunction with a three phase motor 18 and a resistor 154, motor controller 150 is capable of controlling both the speed and the direction of motor 18 under digital control. In the preferred embodiment, three speeds are provided for motor 18, which is a three horse power, 1800 RPM unit. With the preferred 5:1 reduction ratio of gear reducer 20, the preferred speeds are about 750 RPM (slow or "trot" speed), 950 RPM (medium or "slow run" speed), and 1150 RPM (fast or "run" speed).

Power from circuit disconnect 152 is distributed by way of terminal strip 156 and relays 158, 160.

Program means 170 includes at least one, and in this embodiment four, programmable logic controllers 172. In one embodiment, programmable logic controllers (PLC) 172 are the model Micro-One units manufactured by Idec Izumi Corporation of Osaka, Japan. Each PLC 172 may be programmed to contain a series of movements as shown in FIG. 11 and Table 1. Alternatively, a more powerful, single PLC may be utilized which internally stores multiple, user-selectable programs. In addition, a first move toggle 174 is provided to select whether the first move in any particular program is to the right or the left, such that any program is available to be run in one of two mirror image configurations. In the described embodiment, where multiple PLC 172's are provided, a rotary switch 176 selects which PLC 172 is to be connected to motor controller 50. A reset toggle 178 enables the PLC 172 to be reset to step 0. A jog toggle 180 permits manual control of the calf replica for initial positioning by "jogging" it left or right. Jog toggle 180 is also useful for maintenance of the unit and checking operation without activating the program means. Limit switches 182, 184 are provided at the ends of track 14 to provide shut down in the event of a mishap where the calf replica 12 strikes an end. Switches 182 184 are connected to control means 100 by cables 186, 188, respectively.

A three channel radio receiver 190 receives signals from transmitter 112 by way of an antenna 192. Receiver 190 sends signals to relay 160 to start and stop the program or to jog toggle 180 to move the calf replica left or right manually according to the first and second remote control means 110. First remote control means 110 controls the program means 170, with the first control means being operable by rider 106 mounted on horse 108 and serving to start and stop the program. Second remote control means 110 is also operable by rider 106 to cause a selectable jog left or jog right motion of calf replica 12.

Whereas the present invention has been described with respect to a specific embodiment, it will be understood that various changes and modifications will be suggested to one skilled in the art, and it is intended to encompass such changes and modifications as fall within the scope of the appended claims.

I claim:

1. Apparatus for the training of cutting horses, comprising:
   a calf replica mounted to a drive rope for traversing movements with the drive rope;
   motive means for causing the calf replica to traverse with the drive rope, the motive means being reversible in two opposite directions; and
   program means for causing the motive means to execute a programmed series of movements of the calf replica.

2. The apparatus of claim 1 wherein the motive means is capable of traversing the calf replica at a plurality of velocities.

3. The apparatus of claim 1 with the programmed series of movements having predetermined directions, velocities, durations and pauses of the calf replica movements.

4. The apparatus of claim 1 further comprising remote control means for controlling the program means, the remote control means being operable by a rider mounted on a horse simulating a cutting operation with respect to the calf replica.

5. The apparatus of claim 4 with the remote control means serving to start and stop the program.

6. Apparatus for the training of cutting horses, comprising:
   a calf replica mounted to a track for traversing movements along the track;
   motive means for causing the calf replica to traverse along the track, the motive means being reversible in two opposite directions, and the motive means being capable of traversing the calf replica at a plurality of velocities;
   program means for causing the motive means to execute a programmed series of movements of the calf replica, with the programmed series of movements having predetermined directions, velocities, durations, and pauses of the calf replica movements;
   first remote control means for controlling the program means, the first remote control means being operable by a rider mounted on a horse simulating a cutting operation with respect to the calf replica, the first remote control means serving to start and stop the program; and
   second remote control means for controlling the motive means, the remote control means being operable by the rider, the second remote control means causing a selectable jog left or jog right motion of the calf replica.

* * * * *